(12) United States Patent
Zingale

(10) Patent No.: US 6,443,653 B1
(45) Date of Patent: Sep. 3, 2002

(54) MODULAR FLOATING BREAKWATER FOR THE TRANSFORMATION OF WAVE ENERGY

(76) Inventor: Giuseppe Zingale, Via Villini a Mare 5, 95126 Catania (IT)

(*) Notice: Subject to any disclaimer, the term of this patent is extended or adjusted under 35 U.S.C. 154(b) by 0 days.

(21) Appl. No.: 09/831,770

(22) PCT Filed: Sep. 14, 1999

(86) PCT No.: PCT/IT99/00287

§ 371 (c)(1),
(2), (4) Date: May 14, 2001

(87) PCT Pub. No.: WO01/20163

PCT Pub. Date: Mar. 22, 2001

(51) Int. Cl.[7] .................................................. F03B 13/18
(52) U.S. Cl. .......................... 405/76; 290/53; 290/42; 405/21; 405/26; 417/331; 60/398; 60/500; 60/501; 60/497
(58) Field of Search .................. 290/53, 42; 405/21, 405/26, 76; 417/330, 331; 60/398, 497, 498, 499, 500, 501

(56) References Cited

U.S. PATENT DOCUMENTS

| | | | | |
|---|---|---|---|---|
| 732,510 A | * | 6/1903 | Hergenhan et al. | 180/251 |
| 832,482 A | * | 10/1906 | Hutchings | 417/331 |
| 918,870 A | * | 4/1909 | Lawrence | 60/499 |
| 956,796 A | * | 5/1910 | Butler | 417/330 |
| 1,502,511 A | * | 7/1924 | Marvin | 60/501 |
| 1,818,066 A | * | 8/1931 | Jouy | 60/498 |
| 3,274,941 A | * | 9/1966 | Parr | 417/331 |
| 3,307,827 A | * | 3/1967 | Silvers et al. | 60/501 |
| 4,123,185 A | * | 10/1978 | Hagen et al. | 405/76 |
| 4,123,667 A | * | 10/1978 | Decker | 290/53 |
| 4,185,947 A | * | 1/1980 | Menk | 417/333 |
| 4,198,821 A | | 4/1980 | Moody et al. | |
| 4,403,475 A | * | 9/1983 | Kondo | 60/398 |
| 4,742,241 A | | 5/1988 | Melvin | |
| 5,975,865 A | * | 11/1999 | Manabe | 417/331 |

FOREIGN PATENT DOCUMENTS

| | | | |
|---|---|---|---|
| DE | 109 228 | 2/1998 | |
| EP | 0 421 010 | 4/1991 | |
| GB | 566 691 | 1/1945 | |
| GB | 2 068 469 | 8/1981 | |
| JP | 403260203 A | * 11/1991 | E01D/15/14 |

* cited by examiner

*Primary Examiner*—Heather Shackelford
*Assistant Examiner*—Katherine Mitchell
(74) *Attorney, Agent, or Firm*—Young & Thompson

(57) ABSTRACT

A floating modular system for the protection of harbours and the transformation of energy, consisting of:

- a plurality of modules (1) made of metal and/or reinforced marine concrete box-structure, comprising internal air spaces (2) for determining the floating thereof and a lower flooded room (4) for the stabilization, under the impact of the sea waves against the level surfaces (6) for their reflection, for the protection of the opposed harbour environment (AP), provided with floating quays (7);
- a series of floats (8) applied to the wave front of the modules (1), operated by the wave motion for absorbing their energy by double effect pumps (9) with the successive transformation into electric energy;
- a self-levelling system for the anchorage of each of the modules (1), with self-distributed traction;
- a system for balancing the tide variations and for levelling the modules (1);
- a system of joints for coupling the modules (1) according to the extension.

7 Claims, 5 Drawing Sheets

MODULAR FLOATING BREAKWATER FOR THE TRANSFORMATION OF WAVE ENERGY

CROSS REFERENCE TO RELATED APPLICATION

This is the 35 USC 371 national stage of International Application PCT/IT99/00287 filed on Sep. 14, 1999, which designated the United States of America and published as WO 01/20163 in English.

FIELD OF THE INVENTION

The present invention concerns a floating modular system for the protection of harbours and for the transformation of energy, with a self-levelling system for the anchorage with self-distributed traction and balancing of the tide variation and levelling between modules connected by means of couplings.

BACKGROUND OF THE INVENTION

The present invention results from the need to protect the coasts even where there are no gulfs and bays, for the realization of harbour structures away from land protected by waves and independent of energy concerns.

SUMMARY OF THE INVENTION

The aim set forth is achieved by the apparatus according to the present invention which provides a system of coupled modules, self-levelled with respect to the anchorage and to the tide variations, having a plane structure perpendicular to the direction of the wave motion propagation in the high seas and therefore with a sinusoidal oscillation without backwash whirlpools, present in places where the soundings are deeper than half the maximum possible height of a wave, so as to reflect said waves for the complete protection of the opposed reaches of the coast, and comprising means for absorbing the energy of the wave motion transforming it into pneumatic and/or gravitational energy of waters pumped on the spot for the further transformation into electric energy.

The advantages of the present invention are many and remarkable:

the possibility of realizing floating harbour structures opposed to a coast, possibly without gulfs or bays;

the automatism in the anchorage levelling and with respect to the tide variations;

the possibility of obtaining a power autonomy and even an exceeding energy production;

the possibility of transporting the modules by marine traction and the possibility of composing the same with different dimensions;

it is ecological, as the whole system may be covered with cultivations so as to make it aesthetical similar to verdant islands;

the possibility, as a partial alternative to the preceding one, to obtain architectonic realizations supported by the floating modules.

BRIEF DESCRIPTION OF THE DRAWINGS

The present invention will be explained more in detail herein below relating to the enclosed drawings in which an embodiment is shown.

DETAILED DESCRIPTION OF THE INVENTION

Figure 1:
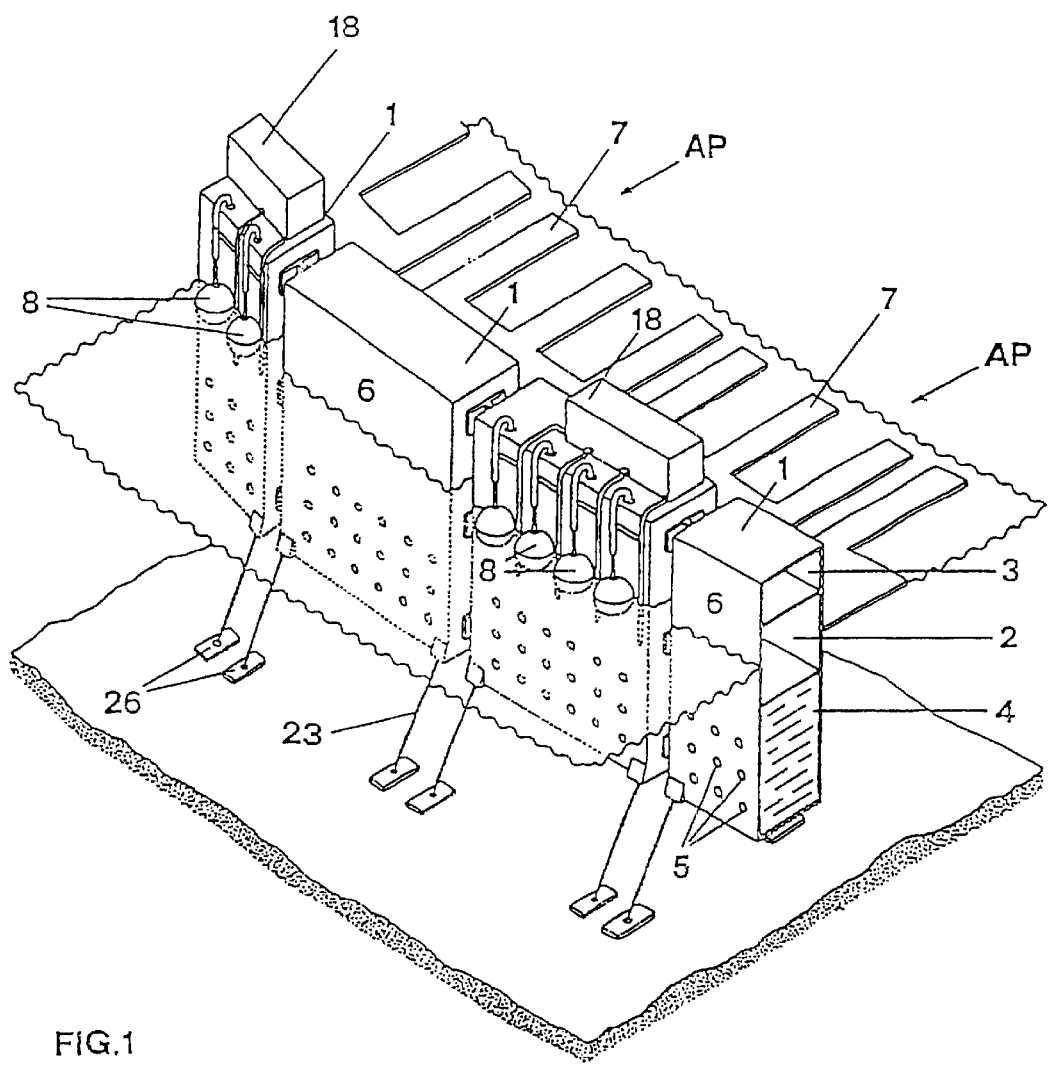
FIG. 1 shows an axonometric scheme of a floating modular apparatus for the protection of harbours and for the transformation of energy.

The enclosed figures show a floating modular system for the protection of harbours and for the transformation of energy, comprising:

a plurality of modules 1, made of metal and/or reinforced marine concrete box-structure, comprising internal air spaces 2 for achieving floating of said modules, upper rooms 3 that can be exploited in different ways, and a lower flooded room 4 which, once filled with water, through openings 5, determines the lowering extent of the center of gravity of a given module and the floating stabilization under the impact of the waves against the level surfaces 6 for the reflection of the waves and the protection of the opposed harbour environment AP, provided with floating quays 7;

a series of floats 8 that will be operated by wave motion for absorbing wave energy with double effect pumps 9 for the accumulation of water at the top of the modules 1 and/or for operating pneumatic systems;

a self-levelling system for the anchorage of each of the modules 1, with self-distributed traction;

a system for balancing the tide variations and for levelling the modules 1;

a system of joints for coupling the modules 1 according to the extension required for the protection.

Figure 2:
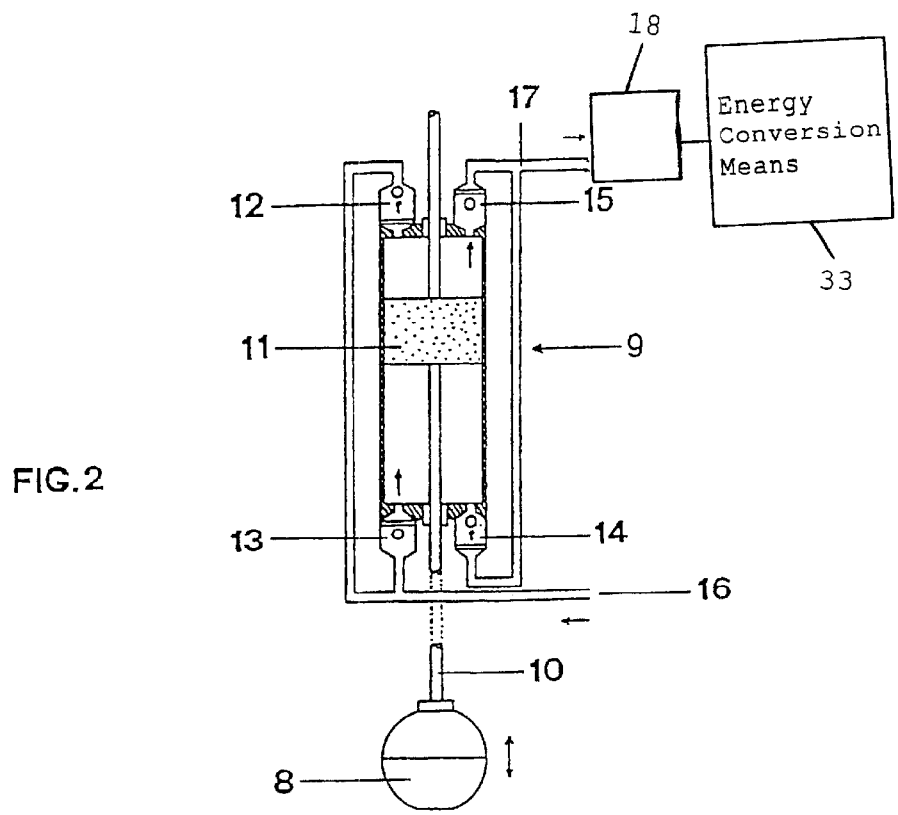
FIGS. 2 and 3 show a lateral scheme of two variants of the means for transforming the wave motion energy into hydraulic gravitational and/or pneumatic energy.

According to the details shown in FIG. 2, each float 8 operates, by means of a vertical rod 10, a piston 11 which, by means of valves 12, 13, 14 and 15 determines, in the rises and in the troughs of the wave, the suction of sea water in conduit 16 and the delivery through a pipe 17 to an accumulation reservoir contained 18 from which, thanks to gravity and operation of energy conversion means 33 such as hydraulic turbines and alternators, the transformation of the mechanic energy of the wave into electric energy is possible.

Figure 3:
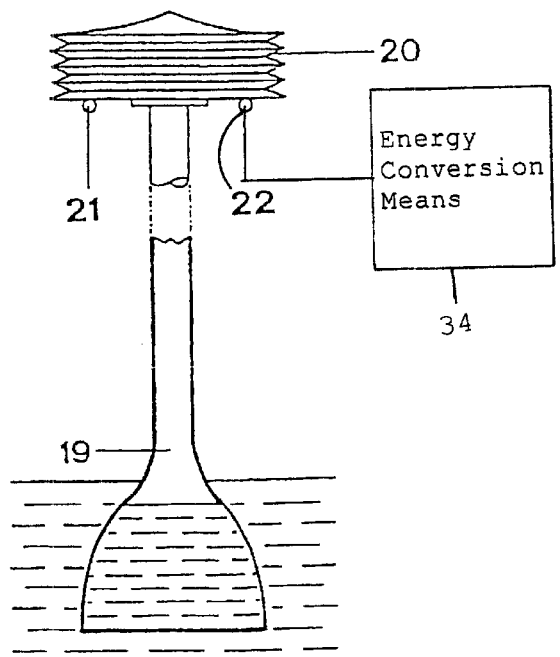

In the variant shown in FIG. 3, said floats 8 have been replaced by hollow structures in the shape of a bell 19, in which the liquid mass of the sea wave has the function of a liquid piston for moving the air collected by an upper pair of bellows 20, by means of a valve 21, and the further delivery thereof, by means of a valve 22, to a duct provided with energy conversion means 34 such as a pneumatic impeller, also operating an alternator or similar, for the production of electric energy.

Figure 4:
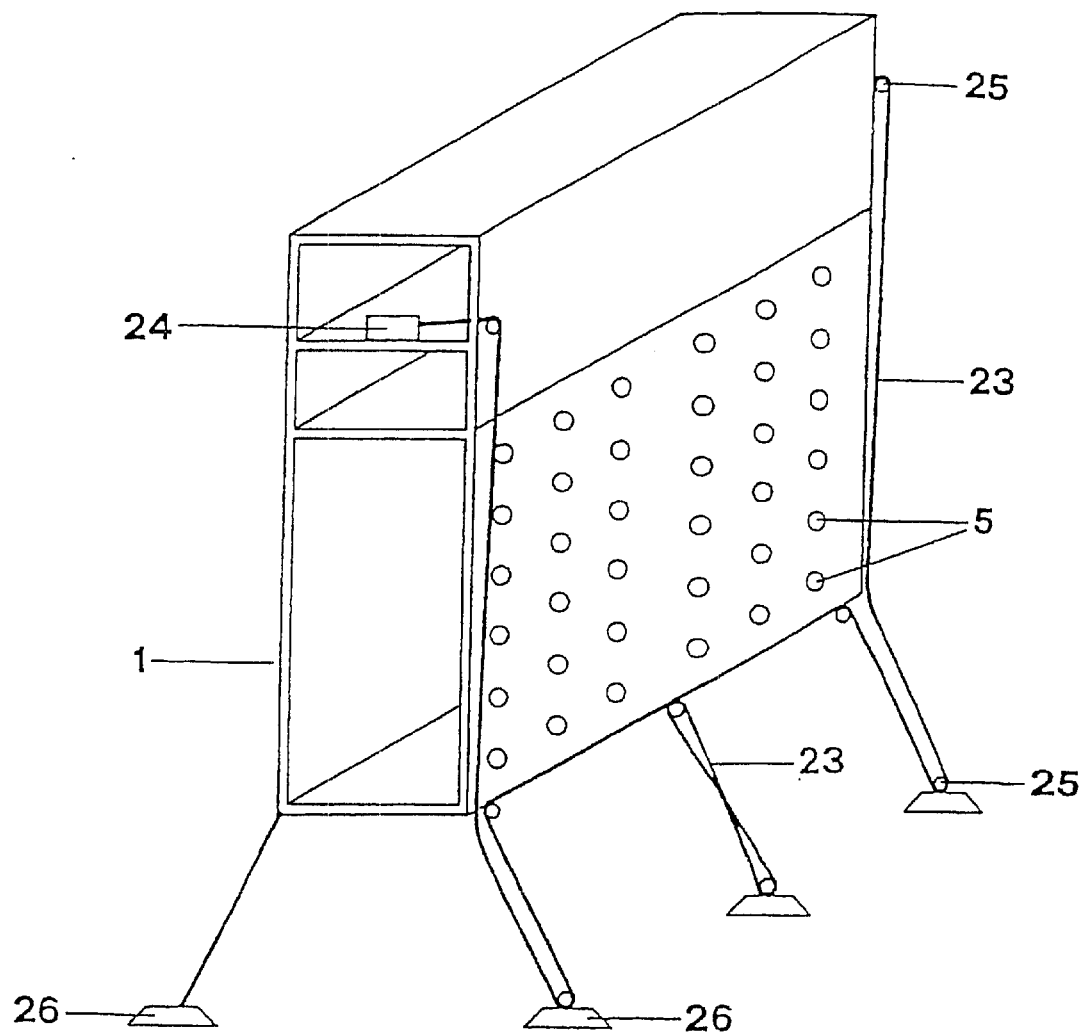
FIG. 4 shows a possible system for the self-levelling of the floating modules' anchorage, with self-distributed traction.

The self-levelling system shown in FIG. 4 comprises one single rope 23 which, starting from the self-blocking winch 24 through pulleys 25, is joined to anchorage points 26 and allows, due to its movement, the adjusting of the level of the modules during installation as well as during changes of the tide level.

Furthermore, said system determines the automatic distribution of the load onto said anchorage points 26, in a static or dynamic position in each module 1, even in case or sudden overload in extreme points. This avoids to overload only one anchorage point thus preventing its breaking or the breaking of the rope.

For quickly replacing said rope 23, due to regular maintenance or to wear, two parallel ways may be taken: in one, the traction rope must slide and in the second one, a cable is used at the same moment of replacement of said rope.

In an embodiment of the system according to the present invention, the sliding points of the rope consist of fixed half pulleys 25 with conical opening for housing the emergency blocking device for a broken rope. Said system is arranged at a distance calculated according to the maximum lift of the coupling hinges between the modules.

In case of casual breaking of the rope, the blocking system allows to put out of use just one portion thereof while the remaining part of the rope will continue to work, allowing the module to be lifted only a few centimeters; in this case, no damage will occur to the structure, and it will be possible to quickly replace the rope.

The replacing of the rope takes place in the room in which said winch(es) 24 is (are) arranged. The top end the bottom of the rope is provided, according to the present invention, with a self-blocking system with conical housing and with big damping springs. The installation of the rope from the top has three advantages:

during installation, the underwater work is limited;

the traction of the rope may be constantly controlled;

the rope may be replaced at any moment, even during rough sea.

Figure 5:
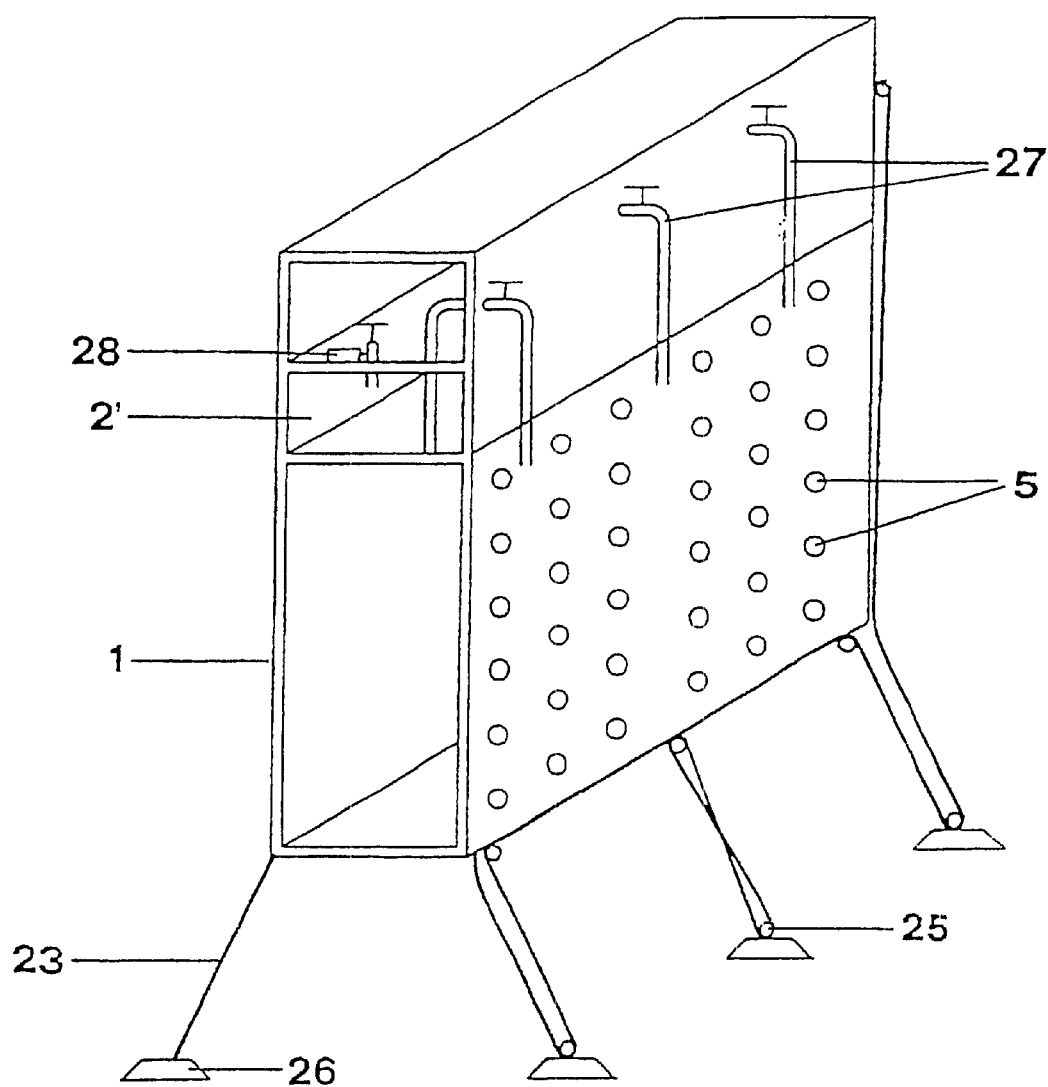
FIG. 5 shows a possible system for balancing the tide variations and for levelling the modules.

The balancing system shown in FIG. 5 provides a dose chamber 2' in each module 1, containing water and air; water is let in through ducts 27 while air is pumped in by means of a compressor 28 so that, by adjusting the quantity of water in the chamber, the lowering or lifting of said floating module 1 is obtained.

Depending upon variation of the sea according to the tide, the air volume required for keeping the module 1 lifted and therefore in a stable position during low tide will be calculated. The stress of the rope will be calculated taking into account the draught during high tide.

The described system allows to lift and lower each module 1 obtaining four remarkable advantages:

for performing the anchorage, after having fixed the rope, a module 1 is lifted discharging water until it reaches the same level as the other modules;

loading and discharging water the exact tension of the rope is obtained, and a plurality of modules may be hinged at the same time without great effort;

each module 1 is independent and therefore no particular device is required for placing it.

Figure 6:
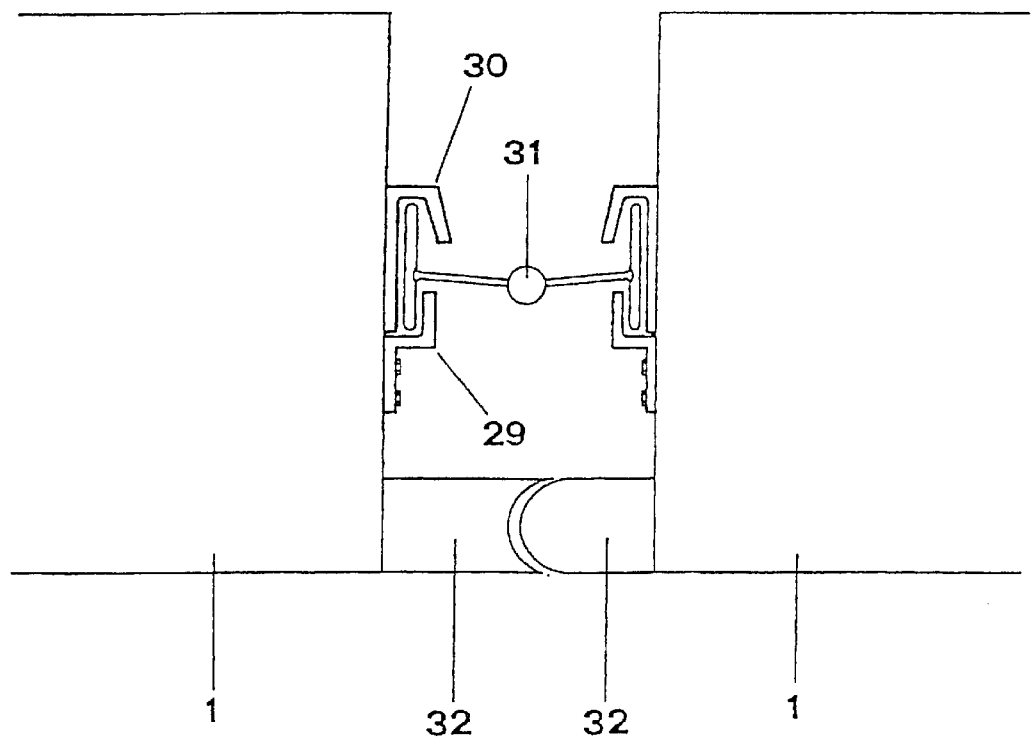
FIG. 6 shows a plant scheme of a possible system of joints between the floating means.

The coupling system between said modules 1 as shown in FIG. 6 consists of two parts: a housing 29, to be positioned on said module 1, and a movable part.

Said housing 29 is closed with a bracket 30 after having inserted a joint 31, realized with a cross-shaped system so as to perform vertical as well as horizontal movements; the ends thereof consist of two plates housed in said module 1.

The empty space between said modules 1 may receive two hard rubber cushions 32: or similar which have the function of dampening the bumps and not allowing the passage of portions of waves to the opposite part of the module. necessary The coupling system described above has proved to be necessary for increasing the safety of the system in case of loosening in the anchorage system or of modest pitching due to sudden overload on the extreme points of each module.

Finally, in case of anomalous frequencies and heights in the bumps against the whole front of said modules 1, a dampened reaction would occur avoiding the breaking of the couplings.

What is claimed is:

1. A floating modular apparatus for protecting a harbor and transforming energy, which comprises:

a plurality of modules made of metal and/or reinforced marine concrete box-structure, comprising internal air spaces for achieving floating of said modules; upper rooms; and a lower flooded room which, once filled up with water via openings, determines the lowering extent of the center of gravity of a given module and the floating stabilization under the impact of waves against level surfaces which reflect the waves and protect the harbor;

a series of float means operated by wave motion for absorbing wave energy with double effect pumps for accumulating water at the top of said modules and operating pneumatic systems;

a self-leveling system for anchoring each of said modules with self-distributed traction;

a balancing system for balancing tide variations and for leveling said modules; and a coupling system between said modules for serially coupling said modules.

2. The floating module apparatus according to claim 1, wherein each of said float means comprises a float which operates a piston via a vertical rod; said piston being operatively associated to valves and determining, in rises and in troughs of the waves, the suction of sea water and the delivery of sea water through a pipe to an accumulation reservoir; said reservoir being operatively associated to energy conversion means for transforming the mechanic energy of the waves into electric energy.

3. The floating modular apparatus according to claim 1, wherein said float means comprise hollow structures in the shape of a bell, in which the liquid mass of the sea waves functions as a liquid piston for moving via a first valve, air collected by an upper pair of bellows, and for subsequently delivering said air via a second valve to a duct operatively associated to energy conversion means for producing electric energy.

4. The floating modular apparatus according to claim 1, wherein the self-leveling system comprises one single rope, which starting from a self-blocking winch through pulleys, is joined to anchorage points.

5. The floating modular apparatus according to claim 1, wherein the balancing system comprises a chamber in each module containing water and air; said water being let in through ducts and air being pumped in by a compressor.

6. The floating modular apparatus according to claim 1, wherein the coupling system between said modules comprises a housing positioned on each module, and a movable joint adapted to be inserted in said housing; said joint having two ends and a cross shape so as to perform vertical and horizontal movements; said ends comprising two plates; and said housing being closed by a bracket after insertion of the joint.

7. The floating modular apparatus according to claim 1, further comprising rubber cushions positioned between serially connected modules for dampening bumps and preventing passage of portions of waves.

\* \* \* \* \*